K. F. NYSTROM.
MEANS FOR LOCKING TRUCKS TO CAR UNDERFRAMES.
APPLICATION FILED MAR. 1, 1919.

1,356,001.

Patented Oct. 19, 1920.

WITNESSES:
Wm. Geiger

INVENTOR.
Karl F. Nystrom
BY George J. Haight
his ATTORNEY

UNITED STATES PATENT OFFICE.

KARL F. NYSTROM, OF MONTREAL, QUEBEC, CANADA.

MEANS FOR LOCKING TRUCKS TO CAR-UNDERFRAMES.

1,356,001.      Specification of Letters Patent.      Patented Oct. 19, 1920.

Application filed March 1, 1919. Serial No. 280,169.

*To all whom it may concern:*

Be it known that I, KARL F. NYSTROM, a subject of the King of Sweden, residing at Montreal, in the Province of Quebec and Dominion of Canada, have invented a certain new and useful Improvement in Means for Locking Trucks to Car-Underframes, of which the following is a full, clear, concise, and exact description, reference being had to the accompanying drawings, forming a part of this specification.

This invention relates to improvements in means for locking trucks to car underframes.

The object of the invention is to provide simple and effective means for preventing accidental separation of trucks from the underframes of cars under excessive shocks or during wrecks to thereby minimize possibility of telescoping.

Figure 1:
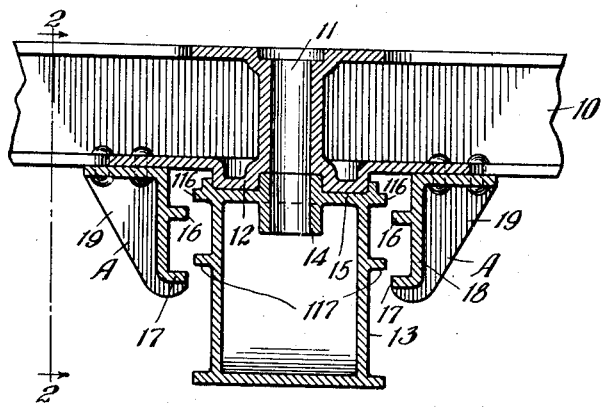
Figure 2:
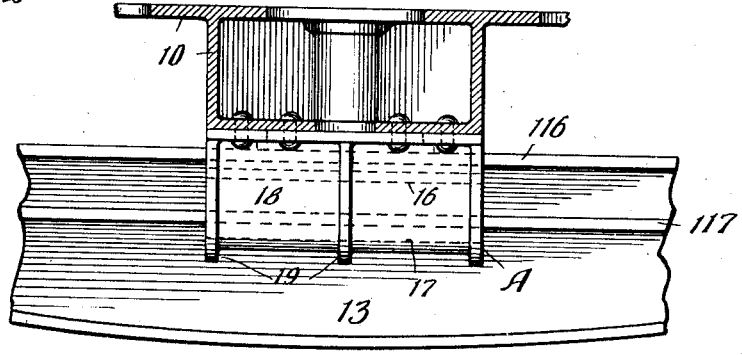

In the drawing forming a part of this specification, Figure 1 is a vertical, longitudinal, sectional view of portions of a car underframe and truck bolster, the section being taken at the pivotal centers of the truck and body bolsters. Fig. 2 is a vertical, sectional view taken substantially on the line 2—2 of Fig. 1.

In the drawing, 10 denotes a body bolster of a car, the same being of the cast type and provided with a center pin bearing 11 and a preferably integral upper center bearing plate 12. The truck bolster 13 is shown as in the form of a casting having also a center pin bearing 14 and a preferably integral lower center bearing plate 15.

To prevent separation or shifting of the truck bolster with respect to the car underframe during wrecks or other abnormal conditions, I provide the body bolster with a pair of depending brackets A—A each securely riveted to or otherwise rigid with respect to the body bolster. Each bracket A is shown as formed with a pair of vertically spaced, inwardly extending flanges or lugs 16 and 17. The lugs 16 and 17 are formed on a depending flange 18 which is suitably braced by ribs 19. On the truck bolster 13, on each side thereof, I provide coöperating sets of vertically spaced, outwardly extending ribs 116 and 117.

As clearly shown from Fig. 1, the inner edges of the ribs 16 and 17 terminate in a vertical plane slightly to one side of the vertical plane in which the edges of the ribs 116 and 117 terminate so that the truck bolster may be easily assembled with the car underframe by a simple vertical movement of the truck bolster upwardly between the brackets A—A. It will also be noted that the ribs 16 and 17 are slightly offset in a vertical direction with respect to the coöperating ribs 116 and 117. With this construction, it is evident that upon shifting of the truck bolster to the right or left as viewed in Fig. 1, with respect to the body bolster or car underframe, one set of ribs 16 and 17 and one set of ribs 116 and 117 would become overlapped so that vertical separation of the truck and body bolsters beyond a predetermined limited amount would be prevented. With this construction, it is evident that the necessary amount of swiveling or turning of the truck bolster with respect to the body bolster is permitted and any slight relative vertical separation within normal limits but that accidental separation of the truck from the car underframe is effectively prevented.

Although I have herein shown and described what I now consider the preferred manner of carrying out my invention, the same is merely illustrative and I contemplate such changes and modifications that come within the scope of the claims appended hereto.

I claim:

1. In car construction, the combination with the car underframe including the body bolster, of a truck bolster, projections rigid with respect to the car underframe, and located in longitudinal alinement with the pivotal connection of the two bolsters, projections rigid with respect to the truck bolster and disposed opposite said first named projections but normally spaced therefrom, said projections being so located that upon shifting of the truck bolster relatively to the body bolster in a direction lengthwise of the car, some of said projections will be placed in overlapped relation and thereby prevent more than a limited amount of vertical separation between the truck bolster and the car underframe.

2. In car construction, the combination with a car underframe including the body bolster, of a truck bolster, opposed sets of projections rigid with respect to the car underframe and located on opposite sides of the truck bolster, and in longitudinal alinement with the pivotal connection between the two bolsters, said projections extending toward the center of the truck bolster, and a coöperating set of projections rigid with respect to the truck bolster and disposed within said projections carried by the underframe, said projections of the truck bolster being out of alinement in a vertical direction with respect to the projections rigid with the underframe.

3. In car construction, the combination with a cast body bolster having depending brackets adapted to straddle the truck bolster, each of said brackets having a rib extended inwardly toward the truck bolster, of a cast truck bolster having ribs projecting outwardly from each side thereof in a direction toward said ribs of the body bolster; the ribs of the truck bolster being out of alinement, vertically, with respect to the ribs of the body bolster, the space horizontally between the ribs of the body bolster being greater than the distance between the edges of the ribs of the truck bolster to thereby permit vertical movement of the truck bolster with respect to the body bolster.

In witness that I claim the foregoing I have hereunto subscribed my name this 28th day of Jan., 1919.

KARL F. NYSTROM.

Witnesses:
P. GORMAN,
A. ARMSTRONG.